United States Patent [19]

Eyuboglu et al.

[11] Patent Number: 5,048,054
[45] Date of Patent: Sep. 10, 1991

[54] LINE PROBING MODEM

[75] Inventors: Vedat M. Eyuboglu, Boston; Ping Dong, Norwood, both of Mass.

[73] Assignee: Codex Corporation, Mansfield, Mass.

[21] Appl. No.: 351,199

[22] Filed: May 12, 1989

[51] Int. Cl.[5] ............................................. H04B 7/10
[52] U.S. Cl. ........................................ 375/8; 375/10;
375/38; 375/100; 455/135; 455/62
[58] Field of Search .................. 375/58, 8, 10, 38, 100;
455/62, 135-137; 370/79; 340/825.03

[56] References Cited

U.S. PATENT DOCUMENTS

| | | | |
|---|---|---|---|
| 4,309,773 | 1/1982 | Johnson et al. | 455/62 |
| 4,630,126 | 12/1986 | Kaku et al. | 358/280 |
| 4,679,227 | 7/1987 | Hughes-Hartogs | 379/98 |
| 4,756,007 | 7/1988 | Qureshi et al. | 375/37 |

OTHER PUBLICATIONS

Eyuboglu, "Detection of Severely Distorted Signals Using Decision Feedback Noise Prediction with Interleaving," IEEE Transaction of Communications, vol. 36, No. 4, Apr. 1988, pp. 401-409.

USSN 351,186, "Trellis Precoding for Modulation Systems".
Kalet, "The Multitone Channel," IEEE Transactions on Communications, vol. 37, No. 2, Feb. 1989, pp. 119-124.

Primary Examiner—Benedict V. Safourek
Assistant Examiner—Tesfaldet Bocure
Attorney, Agent, or Firm—Fish & Richardson

[57] ABSTRACT

A modem for receiving data sent from a remote device over a communication channel by using a single carrier modulated signal, the modem including a receiver for receiving the modulated signal and for receiving a line probing signal sent by the remote device over the channel, the receiver being capable of receiving the modulated signal over any one of a plurality of frequency bands; a line probing processor for measuring characteristics of the channel based upon the received line probing signal; and a selector for selecting one of the plurality of frequency bands, said selection being based upon the measured characteristics of the channel, said selected frequency band to be used for receiving the modulated signal from the remote device.

71 Claims, 3 Drawing Sheets

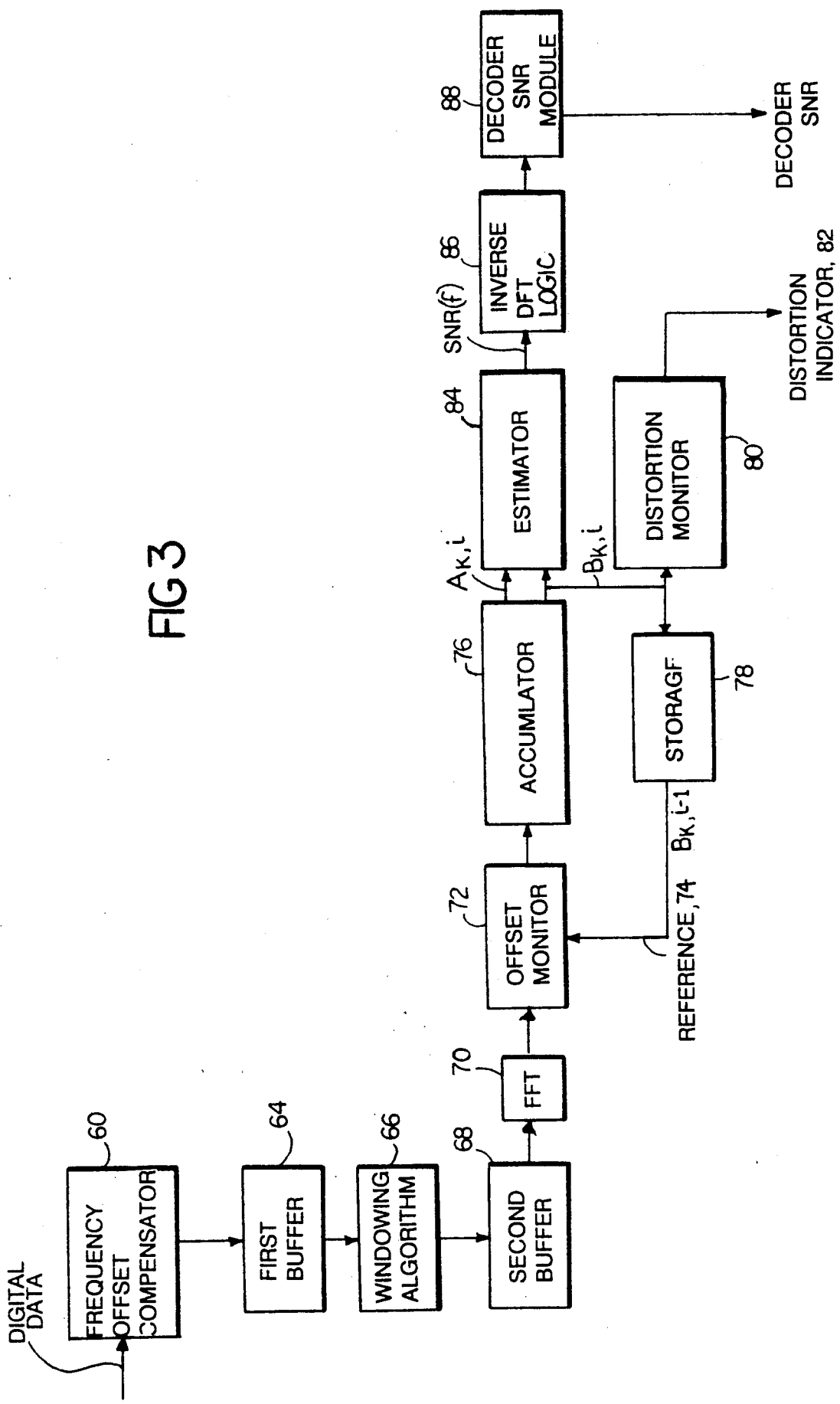

LINE PROBING MODEM

BACKGROUND OF THE INVENTION

This invention relates to data communication equipment or modems.

Modems are devices which employ digital modulation techniques to transmit binary data over analog band limited communication channels. High-speed modems commonly use linear modulation schemes such as quadrature amplitude modulation (QAM).

In linear modulation systems, binary information is collected in groups of M L bits (M is dimensionality and L is the bits/baud which may be fractional) and the resulting sequence is mapped into a sequence of complex-valued signal points, using some coding scheme. The complex sequence is filtered by a shaping filter to limit its bandwidth, and the real and imaginary components of the filtered signal points are used to amplitude modulate the quadrature components of a sinusoidal carrier of some frequency $f_c$. If the bit rate is R b/s, then $Q=R/L$ is the baud rate of the linear modulation system. The baud rate represents the minimum bandwidth required to transmit the modem signal without introducing distortion. (The actual bandwidth of the shaping filter may be larger, but it is typically proportional to the baud rate.) The baud rate and the carrier frequency together determine the transmission band.

The bandwidth efficiency of a linear modulation system is measured by L, the number of bits it transmits per baud. For fixed rate R, increasing L reduces the baud rate and thus the required bandwidth. However, increasing L also reduces the noise tolerance of the system. Therefore, for a given channel characteristic, there is an optimum tradeoff between the baud rate and the number of bits transmitted per baud.

On channels with a rectangular or brickwall-like spectrum and white noise, the baud rate must be chosen approximately equal to the channel bandwidth. On the other hand, if the channel spectrum shows gradual attenuation, it may be preferable to choose the baud rate large enough such that portions of the attenuated regions are included in the transmission band. A large baud rate results in increased distortion, however, an equalizer in the receiver can compensate for the distortion and the noise enhancement caused by equalization may be more than offset by the improved noise tolerance obtained with a smaller L.

In most commercial high-speed voiceband modems that are available today, the baud rate and carrier frequency and thus the transmission band is often fixed; e.g., $Q=2400$ Hz and $f_c=1800$ Hz. Recently, modems were introduced which offer multiple but manually selectable carrier frequencies. In either case, since channel characteristics show considerable variation between different lines or connections, with such modems it is difficult to achieve the best possible performance on all possible lines.

SUMMARY OF THE INVENTION

In general, in one aspect, the invention is a modem for receiving data sent from a remote device over a communication channel by using a single carrier modulated signal. The modem includes a receiver for receiving the modulated signal and for receiving a line probing signal sent by the remote device over the channel, the receiver being capable of receiving the modulated signal over any one of a plurality of frequency bands; a line probing processor for measuring characteristics of the channel based upon the received line probing signal; and a selector for selecting one of the plurality of frequency bands, said selection being based upon the measured characteristics of the channel, said selected frequency band to be used for receiving the modulated signal from the remote device.

In preferred embodiments, the measured characteristics include a frequency response of the channel and/or a signal-to-noise ratio of the channel measured at more than one frequency. The receiver includes an adaptive filter (which may implement trellis precoding) for providing a desired overall impulse response for the channel and at least some of the measured characteristics take into account the adaptive filter. And, the line probing signal is a substantially periodic signal.

Preferred embodiments also include the following features. The line probing processor includes a spectrum analyzer for generating discrete spectral representations of the received line probing signal; a module for estimating a frequency response for the channel based upon the discrete spectral representations of the received line probing signal, the frequency response being estimated at more than one frequency; and a module for estimating a power spectral density of channel noise based upon the discrete spectral representations of the received line probing signal. Also, the modulated signal is a linearly modulated signal (such as a quadrature amplitude modulated signal) and each one of said plurality of frequency bands is characterized by a corresponding baud rate and carrier frequency. The noise estimating module also estimates a power spectrum of the channel response based upon the discrete spectral representations of the received line probing signal and then computes a signal-to-noise ratio corresponding to the channel based upon both the power spectral density of channel noise and the power spectrum of the channel response. The noise estimating module performs weighted periodogram averaging to estimate the power spectral density of channel noise based upon the discrete spectral representations of the received line probing signal and also concurrently estimates the power spectrum of the channel response and the power spectral density of channel noise from the same received line probing signal. The modem also includes a transmitter for transmitting information based upon the measured characteristics to the remote device so that the remote device may identify one of said plurality of frequency bands based upon said transmitted information and then communicate said identified band to the receiver and wherein the selector selects the identified band as said selected band. If the received line probing signal may include an impairment (e.g. frequency offset and/or low frequency phase jitter), the line probing processor also includes an offset monitor for reducing effects of said impairment on the discrete representation of the received signal prior its being used to determine the power spectral density of channel noise. The offset monitor reduces the effects of said impairment by first estimating said impairment and by then rotating the discrete representation corresponding to a current period of the received line probing signal by an amount determined by the estimate of said impairment. The offset monitor estimates said impairment by comparing the discrete spectral representation corresponding to the current period of the received line probing signal to a reference signal derived from the discrete spectral representations corresponding to at least one previous period of the received line probing signal. Also, the discrete spectral representations of the received line probing signal are M-point Discrete Fourier Transforms.

Preferred embodiments also include these additional features. The receiver is capable of receiving the modulated signal at any one of a plurality of bit rates and the modem further includes logic for selecting one of the plurality of different bit rates based upon the measured characteristics of the receiver channel, said selected bit rate to be used for receiving the modulated signal from the remote device. The line probing processor includes a spectrum analyzer for generating discrete spectral representations of the received line probing signal; and a module for computing a nonlinear distortion indicator based upon the discrete spectral representations of the received line probing signal. The receiver also includes a monitor circuit for measuring a power level of the received line probing signal and the measured characteristics includes a quantity derived from the received power level.

In general, in another aspect, the invention is a modem for transmitting data to a remote device over a communication channel by using a single carrier modulated signal. The modem includes a signal generator for generating a line probing signal; a transmitter for transmitting the modulated signal and for transmitting the line probing signal to the remote device over the channel, the transmitter being capable of transmitting the modulated signal over any one of a plurality of frequency bands; a receiver for receiving characteristics of the channel from the remote device, the characteristics being derived by the remote device from the transmitted line probing signal; and a selector for selecting one of the plurality of frequency bands, said selection being based upon the measured channel characteristics, the selected frequency band to be used for transmitting the modulated signal to the remote device.

In general, in yet another aspect, the invention is a modem for receiving data sent from a remote device over a communication channel by using a single carrier modulated signal. The modem includes a receiver for receiving the modulated signal and for receiving a line probing signal sent by the remote device over the channel, the receiver being capable of receiving the modulated signal at any one of a plurality of bit rates; a line probing processor for measuring characteristics of the channel based upon the received line probing signal; and a selector for selecting one of the plurality of bit rates, said selection being based upon the measured characteristics of the receiver channel, the selected bit rate to be used for receiving the modulated signal from the remote device.

The invention determines the best transmission band and maximum bit rate for the modem based upon an offline measurement of the characteristics of the particular channel to which the modem is connected. Thus, in comparison to other conventional modems which use a single carrier frequency modulation scheme, the invention makes better use of the available frequency band of the channel and does so from the beginning of data transmission. Moreover, for modems which utilize an adaptive rate system to establish and maintain optimum performance during the course of data communications, the invention provides an efficient way to initialize the adaptive rate system.

Furthermore, when using a QAM system, the invention achieves close to optimal utilization of the maximum theoretical capacity of the channel.

Other advantages and features will become apparent from the following description of the preferred embodiment, and from the claims.

DESCRIPTION OF THE PREFERRED EMBODIMENT

We first briefly describe the drawings.

FIG. 3 is a block diagram of the portion of the modem which implements the spectrum analysis and the decision matrix computation step shown in FIG. 2.

STRUCTURE AND OPERATION

Figure 1:
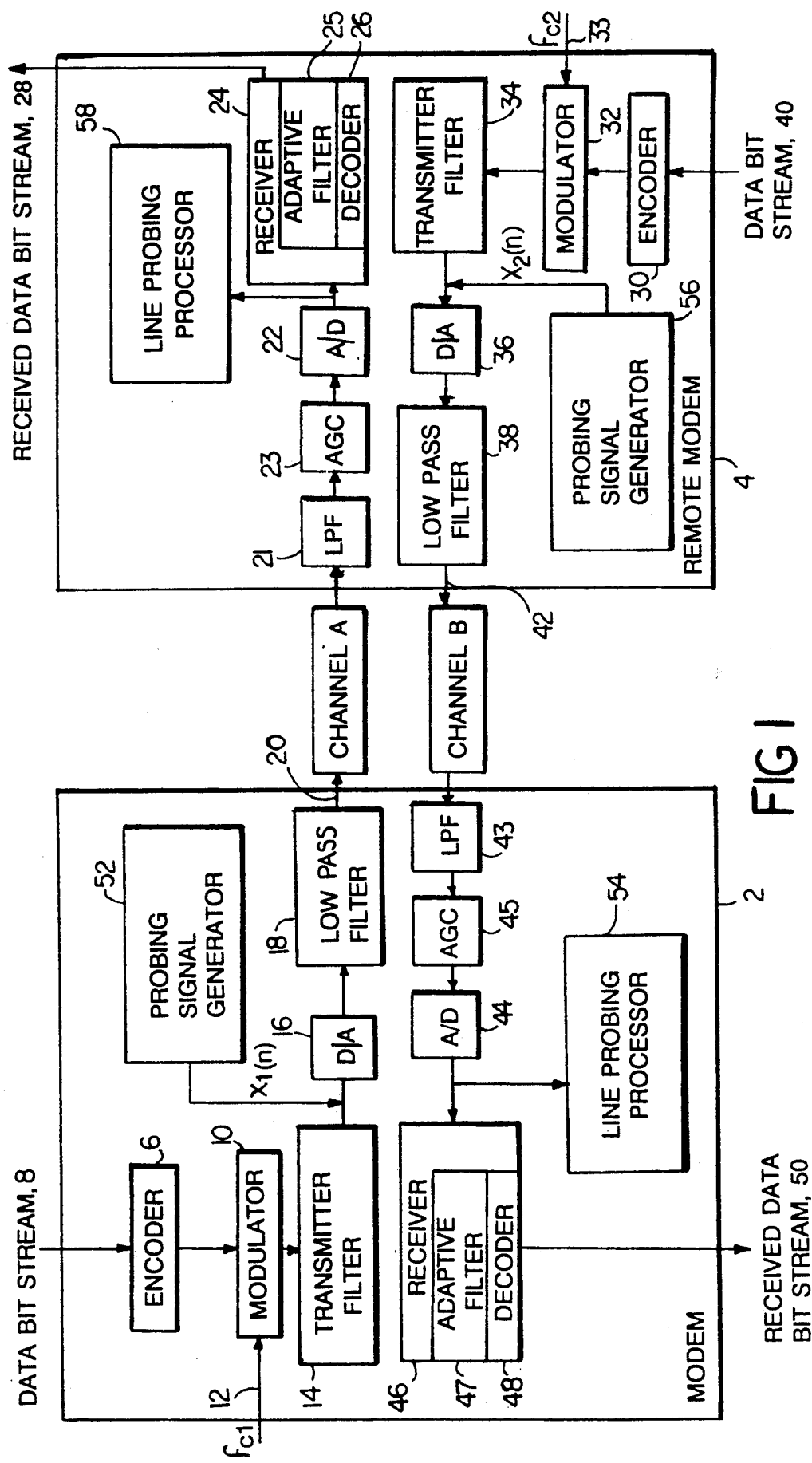
FIG. 1 is a block diagram of a communication system which embodies the invention.

Referring to FIG. 1, a local modem 2, which is of a fourwire type, transmits information to a remote modem 4 over a channel A and receives information sent by the remote device 4 over a channel B. In local modem 2, an encoder 6 receives a data bit stream 8 and encodes the bits according to some coding scheme at a baud rate $Q_1$ selected from a set of available baud rates. Local modem 2 sends $L_1$ bits/baud where $L_1$ is selected based on a set of available bit rates. A modulator 10, using a carrier signal 12 of a frequency $f_{c1}$ selected from a set of available carrier frequencies, modulates the output of encoder 6 and a transmit filter 14 produces pulse shaping to control the bandwidth of the transmit signal, all in accordance with some single carrier modulation scheme, e.g. quadrature amplitude modulation (QAM). Next, a digital-to-analog (D/A) converter 16 and a low pas filter 18 convert the digital transmit signal to an analog signal 20 which is transmitted over channel A to remote modem 4.

In remote modem 4, the received signal passes through a lowpass filter 21, an automatic gain control (AGC) circuit 23, an analog-to-digital (A/D) converter 22 and then a receiver 24, which includes an adaptive filter 25 followed by a decoder 26. Adaptive filter 25 provides a desired overall impulse response for decoder 26 which decodes the received signal according to the particular coding scheme used by local modem 2 to obtain an estimate of the transmitted data bit stream 8.

Remote modem 4 also includes an encoder 30, operating at a baud rate $Q_2$ selected from a set of available baud rates, a modulator 32 with a carrier signal 33 of frequency $f_{c2}$, selected from a set of available carrier frequencies, a transmitter filter 34, a digital-to-analog converter 36 and a low pass filter 38 which convert a data bit stream 40 into an analog signal 42 for transmission over channel B. Remote modem 4 sends $L_2$ bits per baud selected based on a set of available bit rates. Likewise, local modem 2 includes a low-pass filter 43, an automatic gain control circuit 45, an analog-to-digital converter 44 and a receiver 46. Similarly, receiver 46 includes an adaptive filter 47 which produces a desired overall impulse response for a decoder 48 which decodes the signal received over channel B to generate an estimate 50 of the data bit stream 8 transmitted by remote modem 4.

Local modem 2 includes a line probing signal generator 52, which generates a special probing signal sequence $x_1(n)$, and a line probing processor 54 which measures the quality of channel B. Likewise, remote modem 4 includes a corresponding line probing signal generator 56, which generates a probing signal sequence $x_2(n)$, and a line probing processor 58 which measures the quality of channel A.

In general, local modem 2 sends its probing signal sequence $x_1(n)$ to line probing processor 58 of the remote modem 4, which uses the corresponding received signal sequence to compute the signal-to-noise ratio (SNR) for channel A as a function of frequency, i.e. $SNR_A(f)$. Then, for each combination of baud rate and carrier frequency available to it, remote modem 4 computes a corresponding decoder signal-to-noise ratio (which shall be defined shortly). For each baud rate, the carrier frequency which yields the best performance (i.e., as will be explained later, the highest decoder SNR) is saved along with a value representing the performance. These decisions are sent to local modem 2. Similarly, local modem 2 makes decisions based on a similar line measurement process and, in turn, sends its decisions to remote modem 4. Both modems then use the combined information to select the transmission bands (characterized by $Q_1$, $Q_2$, $f_{c1}$, and $f_{c2}$) and the transmission rates (determined by $L_1$ and $L_2$) to be used during subsequent data communications.

The probing sequences are periodic signals selected to fully and uniformly stimulate the entire channel over the spectrum of frequencies which may be useful for data communication. One such sequence consists of a group of equal amplitude tones which are evenly spaced within the frequency band of interest, namely, 100 to 3600 Hz. The frequency separation between the tones determines the frequency resolution of the resulting SNR measurements. It is desirable to select the phases of these tones so as to yield a relatively small peak-to-average ratio for the transmitted signal thereby reducing the possibility of driving the channel beyond its region of linear operation. The following is an example of one such probing sequence which satisfies these criteria:

$$x(n) = A \sum_{k_1}^{k_2} \cos(2\pi k f_\Delta n T_s + \theta_k), n = 0, 1, \ldots, P-1 \quad (1)$$

$$\theta_k = \pi(k-k_1)^2/(k_2-k_1) \quad (2)$$

where
  A is a scaling constant;
  n is a sampling interval index;
  $f_\Delta$ is the frequency resolution;
  k is a frequency interval index;
  $k_1$ specifies the lowest frequency index included in the sequence;
  $k_2$ specifies the highest frequency index included in the sequence;
  $T_s$ equals $1/f_s$, where $f_s$ is the sampling rate; and
  P equals $f_s/f_\Delta$, the number of samples in one period of the line probing signal.

In the embodiment described herein, the sampling rate is 9600 Hz, P equals 256, the frequency resolution $f_{66}$ is 37.5 Hz, $k_1$ equals 3 and $k_2$ equals 96 (i.e., covering a frequency range from 112.5 to 3600 Hz).

Line probing processors 54 and 58 employ the Fast Fourier Transform (FFT) technique to compute SNR(f) for their respective channels. They determine SNR(f) by measuring the frequency response, H(f), and the noise power spectral density, $\Phi(f)$, of the channel at the discrete frequencies excited by the probing signal, i.e. $kf_\Delta$, where $k=k_1, \ldots, k_2$. Then, the processors 54 and 58 compute SNR(f) by using the following well-known relationship:

$$SNR(f) = |H(f)|^2/\Phi(f) \quad (3)$$

Before describing the steps of the measurement algorithm in detail, an explanation of the underlying rationale will be given.

In general, the real-valued received sequence sampled at times $(iP+n)T_s$ can be written in the form:

$$r(i, n) = x(n) * h(n) + w(i, n) \quad (4)$$

$$= y(n) + w(i, n) \; i = 0, 1, \ldots, N-1; \quad (5)$$

$$n = 0, 1, \ldots, P-1$$

where * signifies convolution, x(n) is a transmitted periodic probing signal, h(n) is the sampled channel impulse response, w(i,n) is a potentially colored noise sequence with a power spectral density of $\Phi(f)$, N is the number of observation periods, and i is an index for observation periods.

Since the probing signal x(n) has a flat spectrum within the frequency band of interest, the noiseless channel output y(n) has the following power spectrum:

$$|\Psi(kf_\Delta)|^2 = |H(kf_\Delta)|^2$$

where $H(kf_\Delta)$ is the Discrete Fourier Transform (DFT) of h(n) and $\Psi(kf_\Delta)$ is the DFT of y(n).

Estimates of both $H(kf_\Delta)$ and $\Phi(kf_\Delta)$ may be readily obtained from a P-point DFT of the received segment r(i,n) n=0,1,..., P-1, which is designated hereinafter as $R_i(kf_\Delta)$, i=0,1, ..., N-1. If $\Psi(kf_\Delta)$ were precisely known, then an estimate of the noise spectrum $\Phi(kf_\Delta)$ could be obtained from the following periodogram average:

$$\Phi(kf_\Delta) \approx (1/N) \sum \left| \sum_{i=0}^{N-1} R_i(kf_\Delta) - \Psi(kf_\Delta) \right|^2 ; k_1 \leq k \leq k_2. \quad (6)$$

It can be shown that the periodogram averaging yields an asymptotically unbiased and consistent estimate of the noise spectrum, $\Phi(kf_\Delta)$. That means, as the number of observation periods increases, the mean and variance of the error tend to zero.

Although $\Psi(kf_\Delta)$ is unknown, it may be estimated by using the following DFT averaging:

$$\Psi(kf_\Delta) \approx (1/N) \sum_{i=0}^{N-1} R_i(kf_\Delta); k_1 \leq k \leq k_2. \quad (7)$$

After substituting Eq. 7 into Eq. 6, with straightforward manipulations, Eq. 6 can be written in the following form:

$$N\Phi(kf_\Delta) \approx \Sigma_i |R_i(kf_\Delta)|^2 - |(1/\sqrt{N})\Sigma_i R_i(kf_\Delta)|^2 \quad (8)$$

With the substitutions $$A_k = \Sigma_i |R_i(kf_{66})|^2; k_1 \leq k \leq k_2 \quad (9)$$

$$B_k = (1/\sqrt{N})\Sigma_i R_i(kf_{66}); k_1 \leq k \leq k_2 \quad (10)$$

this further reduces to:

$$\Phi(kf_{\Delta}) \approx (A_k - B_k^2)/N; \; k_1 \leq k \leq k_2. \quad (11)$$

Note that:

$$|H(kf_{\Delta})|^2 \approx B_k^2; \; k_1 \leq k \leq k_2. \quad (12)$$

The line probing processors 54 and 58 use the above equations to simultaneously estimate the noise spectral density $\Psi(kf_{\Delta})$ and the channel frequency response $H(kf_{\Delta})$.

Every observation period, the algorithms accumulate and store $\Sigma_i |R_i(kf_{\Delta})|^2$ and $(1/\sqrt{N})\Sigma_i R_i(kf_{\Delta})$. After N observation periods, the results equal $A_k$ and $B_k$, $k=k_1$, ..., $k_2$, respectively.

The estimate of $\Phi(kf_{\Delta})$ at any given frequency $kf_{\Delta}$ may be affected by the spectral energy density at other frequencies and thus may be "biased". When computing the DFT's from the received signal r(i,n) with an FFT technique, the line probing processors 54 and 58 use windowing, a known spectrum analysis technique for improving the performance of simple periodogram averaging. In the embodiment described herein, a Hanning window of length 2P is used. The Hanning window has a raised cosine shape with a 100% roll-off. To reduce the calculation time associated with using a window of length 2P, two successive periods of received data are overlapped. Of course, a window of duration longer than 2P may be used to improve accuracy, however, this would increase the amount of computations required for completing the FFT calculations.

The received signal r(i,n) may also have a frequency offset that can substantially degrade the accuracy of the estimation of $R_i(kf_{\Delta})$ and, in turn, the noise spectrum. Although, windowing reduces effects of the frequency offset, additional steps are taken to reduce it even further. In the noise-free situation, the presence of frequency offset causes the DFT for the current observation period to differ from the DFT for the preceding period by a constant phase factor. That is:

$$R_{i+1}(kf_{\Delta})/R_i(kf_{\Delta}) = \text{phase factor} = \exp[j2\pi f_0 PT_s] \quad (13)$$

where $f_0$ is the frequency offset. This relationship is used to estimate the phase factor. Then, the estimated phase factor is used to rotate the DFT's to cancel the effects of the frequency offset.

In the embodiment described herein, line probing processors 54 and 58 use the accumulating estimates of $B_k$, $k=k_1$, ..., $k_2$, (which shall be designated as $B_{k,i}$, where i indicates the observation period) rather than the DFT from the previous period, to achieve basically the same results. That is, after the initial period of accumulation, the newly computed periodograms $R_i(kf_{\Delta})$ are compared with the corresponding $B_{k,i-1}$ by taking the inner product:

$$E = \Sigma_k B_{k,i-1} R_i^*(kf_{\Delta}) \quad (14)$$

where * is the complex conjugate and the summation is over $k_1 \leq k \leq k_2$. The quantity E, a complex number, is normalized by using a polynomial approximation of the function $1/\sqrt{x}$ where x equals $[|\text{Re}[E]|^2 + |\text{Im}[E]|^2]$ and then it is used to rotate $R_i(kf_{\Delta})$ before $R_i(kf_{\Delta})$ is added to $B_{k,i-1}$ to produce $B_{k,i}$, a new estimate of $B_k$.

In addition to SNR(f), an important source of distortion for data transmission is non-linear distortion (NLD). NLD causes the energy in the transmitted frequency components to be spread over other frequencies. Although there are standard techniques for measuring NLD on telephone lines, it is desirable to obtain a rough estimate of NLD by using the line probing signals. Thus, to measure NLD, the line probing signal is slightly modified from the one described above. This is done by omitting some preselected frequency lines. Line probing processors 54 and 58 then measure the strength of the received line probing signals at these omitted frequencies and average those measurements to arrive at a rough estimate of NLD. As will be described later, the estimate of NLD is then taken into account in estimating the maximum achievable bit rates for the modems.

To account for the missing frequencies, line probing processors 54 and 58 estimate the missing values of SNR($kf_{\Delta}$) by averaging the values of SNR($kf_{\Delta}$) corresponding to frequency lines in the vicinity of the omitted frequency lines. The location of the omitted frequency lines are selected so that they are common to all transmission bands available to the modem and lie near the mid-range of such bands, where SNR(f) is likely to be relatively uniform. By selecting the omitted frequencies in this manner, the error caused by this approximation is kept small.

After N observation periods have elapsed and the estimates of $A_k$ and $B_k$ have been accumulated for $k_1 \leq k \leq k_2$, processors 54 and 58 compute SNR($kf_{\Delta}$) for the corresponding channels using Eqs. 11, 12 and 3, above. The computed SNR($kf_{\Delta}$) is then used to determine for each baud rate the carrier frequency which yields the best receiver performance. The way this is determined will now be described.

The decoder in each modem operates on a properly equalized signal, i.e. one which has passed through the receiver's adaptive filter. Thus, it is generally the SNR at the output of the adaptive filter, i.e. the decoder SNR, that is most relevant to the performance of the receiver. The decoder SNR is related to SNR($kf_{\Delta}$), and the precise relationship depends upon the type of adaptive filter used in the receiver.

In the described embodiment, modems 2 and 4 are equipped with a trellis precoding equalization system such as the scheme disclosed in the U.S. patent application entitled "Trellis Precoding for Modulation Systems," by Eyuboglu and Forney, filed on an even date herewith and hereby incorporated by reference. In trellis precoding, each receiver 24 and 46 includes a fractionally-spaced minimum-mean-squared error linear equalizer whose output is sampled at the baud rate, followed by a linear prediction filter responsible for whitening the residual error sequence at the output of the linear equalizer. If $\{x_n'\}$ is the complex sequence transmitted by the trellis precoder, then the received sequence at the output of the prediction filter can approximately be written in the form $$\{r'_n\} = \{x_n'\} * \{h'_n\} + \{w_n\}, \quad (15)$$

where $\{h'_n\}$ is a causal (i.e., $h'_{nb} = 0$, $n > 0$) overall impulse response and $\{w_n\}$ is a white error sequence of some variance $\sigma^2$. Here, it may be assumed that the filters are scaled such that $h_0 = 1$. Then, under the assumption that the error signal can be modeled as Gaussian and neglecting other small effects, it is known that the performance of the trellis precoder is given by $$P_e \approx K \, Q(d_{min}/2\sigma) \quad (16)$$

where K is a constant, $Q(\alpha)$ is the Gaussian tail function given by $$Q(a) = (1/\sqrt{2\pi}) \int_{\infty}^{a} \exp\{-a^2/2\} \, da \qquad (17)$$

and $d_{min}$ is typically taken as the minimum distance between L allowable channel output sequences. The quantities K and $d_{min}$ depend on the trellis code that is used in conjunction with the trellis precoder. Stated approximately, $d_{min}$ decreases by a factor of $\sqrt{2}$ for every increment in L, the number of bits per baud, assuming that the average power of the precoder output is kept constant. The sampled decoder SNR may be defined as $d^2_{min}/2\sigma^2$. The baud rate or carrier frequency affect the decoder SNR only through the noise variance $\sigma^2$.

To determine the relationship between $\sigma^2$ and SNR(f), first note that at the equalizer output, after demodulation, the noise spectrum is given by $$S_n(f) = \Phi(f)/|H(f)|^2, \quad |f - f_c| < Q/2, \qquad (18)$$

where Q equals the baud rate and it is assumed that the transmitted signal has zero excess-bandwidth. (Typically, highspeed modems use 10-12% excess bandwidth; however, experiments have shown that this has only a small effect on performance). Now, the autocorrelation sequence of the noise sequence can be computed as $$g_n = T \int_{|f - f_c| < Q/2} \Phi(f)/|H(f)|^2 \, e^{j2\pi f n/Q} \, df, \quad n = 1, 2, \ldots \qquad (19)$$

Since the spectra are measured at discrete frequencies $kf_\Delta$, $g_n$ can be approximated as follows:

$$g_n = a \, \Sigma \Phi(kf_\Delta)/|H(kf_\Delta)|^2 \exp(j2\pi k f_\Delta n/Q), \, n=1,2,\ldots \qquad (20)$$

$$k_1(Q,f_c) \leq k \leq k_2(Q,f_c)$$

where a is some normalization factor and $k_1(Q,f_c)$ and $k_2(Q,f_c)$ are the frequency indices corresponding to the bandedges assuming the baud rate Q and carrier frequency $f_c$. Once $\{g_n\}$ are determined, $\sigma^2$ can be computed using well-known formulas for linear prediction. For example, if it can be assumed that the noise sequence is a first-order autoregressive (AR) process as described by Eyuboglu in "Detection of Severely Distorted Signals Using Decision Feedback Noise Prediction with Interleaving" IEEE Trans. on Communications, April, 1988, then, $\sigma^2$ is given by $$\sigma^2 = g_0 - |g_1|^2/g_0. \qquad (21)$$

Thus, by using Eqs. (20) and (21), line probing processors 54 and 58 can determine for each baud rate Q, the carrier frequency $f_c(Q)$ which yields the smallest noise power $\sigma^2(f_c(Q))$.

The computation of decoder SNR described above can be extended to higher order AR models using well known formulas for the minimum-mean-square error prediction error as described in Jayant and Noll, "Digital Coding of Waveforms" Prentice-Hall, 1984.

The description given above assumes that the fractionally-spaced linear equalizer has a sufficiently large span to reduce the effects of phase distortion to a negligible level. In highspeed modems that is often a reasonable assumption. In applications where this condition may not be satisfied, the effect of phase distortion has to be taken into account. Furthermore, if the assumption of a first-order AR model does not hold, then the residual noise sequence may be correlated and its effect on performance may have to be taken into consideration.

Having described the nature of the computations performed by processors 54 and 58, the steps of the measurement algorithm, shown in FIG. 2, will now be described in more detail. Local modem 2 starts the line probing process by transmitting a line probing tone signal at some fixed frequency for a fixed number of bauds (designated in FIG. 2 as S) over channel A (step 110) while at the same time, remote modem 4 monitors channel A to detect the tone signal (step 120).

After detecting the line probing tone, remote modem 4 initiates a period of tone training (step 130). During this period, it uses a phase-locked loop (PLL) to learn the frequency offset in the incoming tone and at the same time it adjusts its AGC setting to achieve a desired signal level prior to A/D conversion. After a fixed amount of time, the receiver freezes both its AGC setting and its PLL and then switches to a transition detection state to detect the arrival of the wideband line probing signal transmitted from the local modem 2 (step 140).

In the meantime, the transmitter in modem 2 continues to transmit its tone for at least S bauds and until it receives a reply tone from remote modem 4. Then, processor 54 causes probing signal generator 52 to generate the above-describe special probing signal and transmits it to remote modem 4 for at least N periods (step 150). After receiving N periods of the probing signal from remote modem 4, modem 2 switches to a communication mode for sending line probing measurement results to remote modem 4 (step 160).

Since the line probing algorithm implemented by remote modem 4 is the same as the line probing algorithm of modem 2, the sequence of events in both modems 2 and 4 and their timing is also basically the same. Thus, remote modem 4 sends its tone signal, generates its probing signal for transmission to modem 2, and enters a corresponding communication mode at about the same times as these events occur in modem 2.

As soon as remote modem 4 detects the probing signal on channel A, processor 58 begins a spectrum analysis of the received probing signal (step 170). First, line probing processor 58 measures the channel and noise spectra and from these computes SNR(f) and then the decoder SNRs.

The elements of the modem which perform the spectrum analysis and the decision matrix computation of step 170 are shown in FIG. 3. After being converted to a digital signal, the received real-valued probing signal passes through a frequency offset compensator 60 which multiplies it by a complex-valued rotation factor which was derived from the frequency offset estimate obtained during the initial tone training described above. A first buffer 64 temporarily stores the rotated digital signal for subsequent processing.

After buffer 64 has received data corresponding to two periods of the line probing signal, a windowing algorithm 66 applies a Hanning window to the two periods of rotated data stored in buffer 64 to produce a frame of windowed data which consists of 2P complex-valued samples. These are then stored in a second buffer

68. Next, FFT algorithm 70 computes a P-point DFT from the stored frame of windowed data.

After each new period of data is received and stored in first buffer 64, windowing algorithm 66 uses the stored data, along with the data from the preceding period, to compute a new frame of windowed data. FFT algorithm 70 then computes a new P-point DFT using the new frame of windowed data. In other words, for each period of the received probing signal, a new P-point DFT is generated from the two most recent periods of data. Thus, one period of data is used to compute the DFT for two successive periods.

The P-point DFT's from FFT algorithm 70 are passed to a frequency offset monitor 72, which first estimates and then reduces any uncancelled frequency offset which may be present. Offset monitor 72 estimates the amount of uncancelled frequency offset by comparing each computed DFT against a reference 74 which corresponds to accumulated DFT's from previous observation periods. Offset monitor 72 then rotates the elements of the DFT by an amount that corresponds to the estimated uncancelled frequency offset for that DFT, thereby generating the rotated DFT, $R_i'(kf_\Delta)$.

Next, an accumulator 76 receives these rotated DFT's and uses them to generate the quantities $A_k$ and $B_k$-as follows. Initially, accumulator 76 sets both $A_{k,0}$ and $B_{k,0}$ to zero. During the $i^{th}$ period, when $R_i'(kf_\Delta)$ has been compiled, for each k in the range $k_1 \leq k \leq k_2$, accumulator 76 computes the squared magnitude of $R_i'(kf_\Delta)$ and adds the result to the stored value for $A_{k,i-1}$ to generate $A_{k,i}$. Accumulator 76 also divides the $R_i'(kf_\Delta)$ by $\sqrt{N}$ and adds this result to the stored value for $B_{k,i-1}$ to generate $B_{k,i}$. $A_{k,i}$ and $B_{k,i}$ are accumulated in this manner for N observation periods. (Note that $A_{k,i}$'s are real numbers, whereas $B_{k,i}$'s are complex numbers.)

The $B_{k,i}$'s generated during each observation period are stored in storage element 78 for use as a reference signal 76 during the next observation period. That is, for the $i^{th}$ observation period, reference signal 76 is equal to $B_{k,i-1}$ computed during the previous observation period. Offset monitor 72 uses reference signal 76 to compute Eq. 14 described earlier. That is, offset monitor 72 calculates the complex conjugate of the current P-point DFT from FFT algorithm 70, i.e. $R_i^*(kf_\Delta)$, and then computes the inner product of $B_{k,i-1}$ and $R_i^*(kf_\Delta)$. The inner product is then normalized to arrive at an estimate of the phase offset. It should be noted that by using this approach, the modem can compensate for any residual frequency offset as well as track small amounts of low frequency phase jitter.

Since preselected frequencies were omitted from the line probing signal, the values of $B_k$ at the locations of the omitted frequencies provide a measure of the non-linear distortion associated with the channel. Thus, after $B_{k,N}$ has been determined for N observation periods, a distortion monitor 80 estimates the non-linear distortion by squaring the amplitudes of $B_{k,N}$'s corresponding to omitted frequencies and computing the average of the resulting squared amplitudes. The average is then supplied by monitor 80 as a non-linear distortion indicator 82.

Using the $A_{k,N}$'s and $B_{k,N}$'s from accumulator 76, an estimator 84 then estimates the noise spectrum, $\Phi(kf_\Delta)$, and the channel spectrum, $|H(kf_\Delta)|^2$, for all frequencies used in the probing signal. Estimator 84 accomplishes this by first computing $|B_{k,N}|^2$ and then using Eqs. 11 and 12, described above. Using the estimates for the noise spectrum and the channel spectrum, estimator 84 then computes $SNR(kf_\Delta)$ in accordance with Eq. 3, described above. For the omitted frequency lines, estimator 84 approximates their SNR value by averaging the values of $SNR(kf_\Delta)$ over frequency lines in their vicinity.

Transform logic 86 receives the resulting values for $SNR(kf_\Delta)$ from estimator 84 and computes the inverse DFT specified by Eq. 20, above. The output of transform logic 84 is the noise autocorrelation function described earlier. Finally, a decoder SNR module 88 calculates the decoder SNR from the output of transform logic 86 according to Eq. 21.

Figure 2:
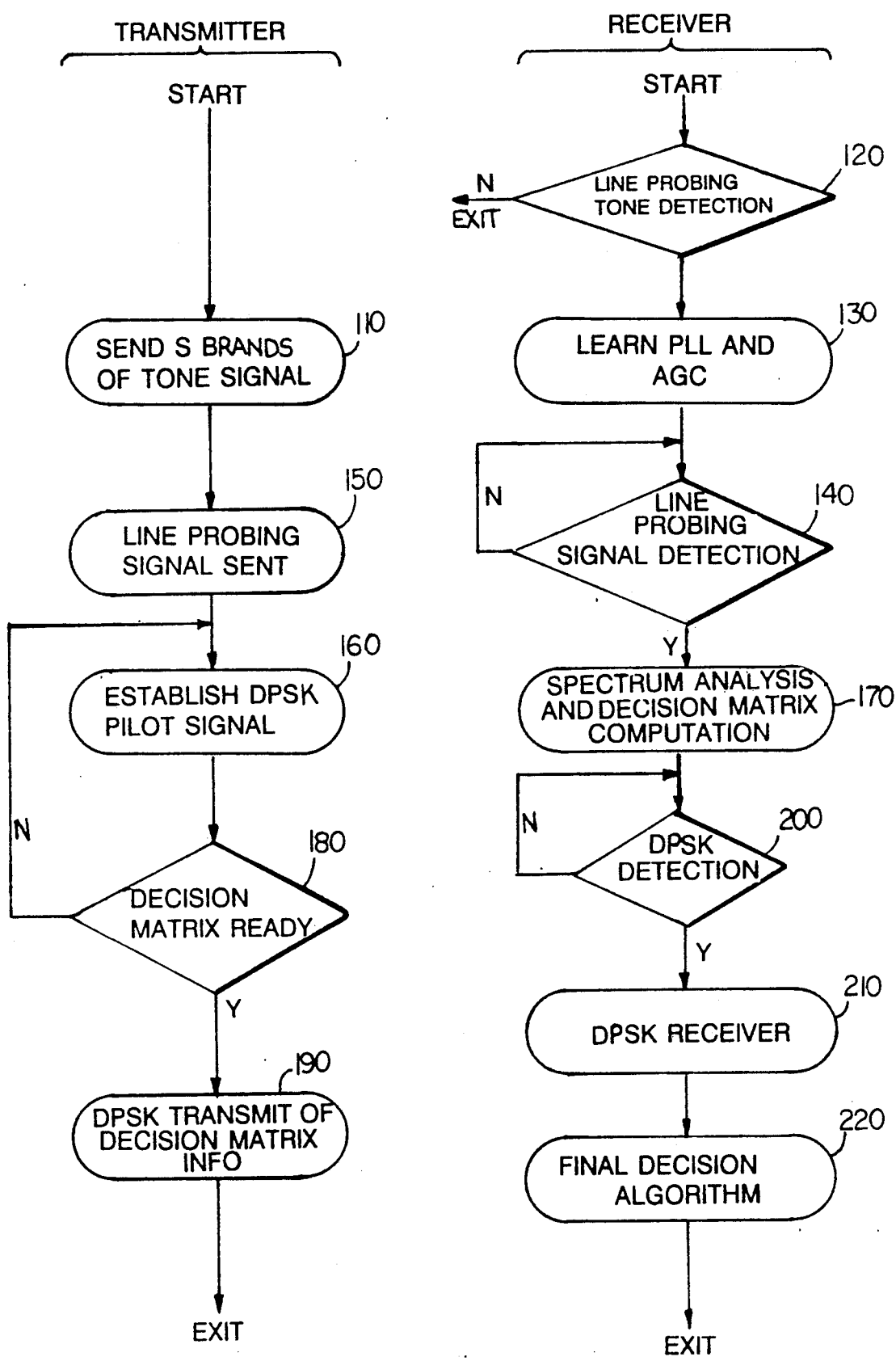
FIG. 2 is a flow chart depicting the operation of the line probing shown in FIG. 1.

Using the approach just described and also as part of step 170 shown in FIG. 2, remote modem 4 then makes a number of local decisions. Such local decisions help reduce the amount of information that needs to be exchanged with local modem 2. (Note that the local decision procedures to be described are the same for both modems 2 and 4. In particular and in accordance with the approach described earlier, remote modem 4 uses $SNR(kf_\Delta)$ to compute the decoder SNR's for each baud-rate/carrier-frequency combination available to it and then selects the best carrier frequency for each of the available baud rates.

The computed decoder SNR's, the non-linear distortion indicator, the signal power level of the received signal, as reflected by the AGC setting, and a user specified error performance requirement are then used to determine for each available baud-rate Q (using the best-carrier-frequency) and the maximum number of bits per baud $L_1(Q_1)$ that remote modem 4 can receive at without violating the performance requirement. To determine $L_1(Q_1)$, modem 4 uses a precomputed conversion table which is indexed on the basis of the above-identified information.

Basically, the conversion table depends upon the modem's modulation scheme, the coding gain of the coding scheme used, the way those schemes are implemented, and the error performance requirements. If trellis precoding is employed, the relationship between performance and decoder SNR is approximately described by Eq. 16 above. Nonlinear distortion and receive power level, however, modify that relationship somewhat. The actual entries in the conversion table can be derived, in part, from empirical observations and experiments in which the relationship between performance and the decoder SNR, NLD, and receive power level is measured for the particular type of modem being used.

After $L_1(Q_1)$ is obtained for all baud rates, remote modem 4 can calculate, for each of the available baud rates $Q_1$, the maximum bit rate $R_1(Q_1)$ it can receive from local modem 2 according to the following relation:

$$R_1(Q_1) = Q_1 \times L_1(Q_1)$$

When the spectrum analysis is complete, line probing processor 58 stores the results in a decision matrix. Upon completing the entries to the decision matrix, processor 58 indicates that its matrix is ready (step 180) and remote modem 4 transmits the information contained in its matrix to local modem 2 over channel B (step 190).

In each modem, the user or the network system may specify a maximum receive bit rate, $R_{max}$, and a minimum receive bit rate, $R_{min}$. This user-specified operating range is taken into account when the modem determines the decision matrix entries. Thus, if the selected bit rate for a particular baud rate is greater than $R_{max}$, then modem 2 sets it to $R_{max}$. Whereas, if the selected bit rate for a particular baud rate is less than $R_{min}$, then modem 2 sets it to $R_{min}$ and also sets a flag associated with that baud rate to indicate that the performance requirement cannot be met at that baud rate. Note that a user can force a desired bit rate by setting $R_{max} = R_{min}$ = desired rate.

The user also has the option to disable some (but not all) of the available baud rates. For example, the user may wish to operate at a specific baud rate. A second flag corresponding to each of the available baud rates is set to indicate whether that baud rate is disabled.

Of course, other constraints, besides those mentioned above, may also limit the communication options available to modems 2 and 4. For example, a user may require symmetric baud rates or symmetric bit rates in both transmission directions. Such additional constraints are stored in the decision matrix of the corresponding modem and are sent to the other modem along with other relevant information.

Specifically, during step 190, the following information is sent from the remote modem 4 to local modem 2:
a) the maximum bit rate at which the remote modem can receive for each of the available baud rates;
b) the best carrier frequency to be used for each of the available baud rates;
c) a flag for each of the available baud rates indicating whether the performance requirement can be met;
d) a flag for each of the available baud rates, indicating whether that baud rate is disabled in the remote modem;
e) a flag to indicate whether symmetric bit rates are required for both directions of transmission; and
f) a flag to indicate whether symmetric baud rates are required for both directions of transmission.

Naturally, some synchronization bits to indicate to beginning of the data and parity bits for error checking may also be transmitted during this information exchange phase Since the decision matrix information is short, it can be transmitted quickly and reliably by using a simple, low-speed, robust modulation scheme which does not require a long training procedure. In this embodiment, this is achieved by using Differential-Phase-Shift-Keying (DPSK) at 300 bps. Other reliable modulation schemes such as low-speed Frequency-Shift-Keying (FSK) may also be employed.

Processor 54 monitors channel B for the presence of a DPSK signal carrying the decision matrix for channel A from remote modem 4 (step 200). When the DPSK signal is detected on channel B, processor 54 activates a DPSK receiver in modem 2 that includes a timing recovery circuit to provide correct sampling phase and then processor 54 decodes the decision matrix from the DPSK signal (step 210).

The DPSK receiver first looks for a synchronization pattern from the received bit stream. Once the pattern is detected, the receiver decodes the subsequent bits carrying the decision matrix. At the same time, the receiver also computes a parity check. At the end of DPSK transmission, this parity is compared with the one received from the remote modem. If they do not agree, a DPSK transmission error is flagged.

After modems 2 and 4 have exchanged their decision matrix information in this manner, they have complete information about channels A and B, including the operational constraints. Modem 2 then executes a final decision algorithm to select the carrier frequencies baud rates and bit rates to be used for communication over channels A and B (step 220). Since both modems 2 and 4 have the same information, they make the same selections and a further exchange of final decisions is not required.

The final decision algorithm first checks if any one of the modems required symmetric bit rates, or symmetric baud rates. If one of modems requested a symmetric baud rate or a symmetric bit rate, the request is enforced on both modems.

More specifically, if symmetric baud rates are required, the decision algorithm checks whether there are allowable baud rates common to both modems (i.e., baud rates which both satisfy the performance requirements and are allowed). If such baud rates exist, modems select the baud rate that maximizes the smaller of the two bit rates. When there are no allowable baud rates common to both modems, the decision algorithm includes baud rates that do not satisfy the performance requirement to find a common baud rate. A possible criterion for determining the reasonable baud rate may be to use a baud rate whose carrier frequency is closest to the center of the frequency band. Since both modems use the same criterion to choose this baud rate, they should both reach the same conclusion and no confusion will occur.

On the other hand, if symmetric baud rates are not required, the decision algorithm chooses from all of local modem's allowed baud rates the receiver baud rate that maximizes local modem's receiver bit rate and it chooses from all of remote modem's allowed baud rates the transmitter baud rate that maximizes remote modem's receiver bit rate.

After the transmitter and the receiver baud rates for the two modems are finalized, the best carrier frequencies associated with these baud rates are used as the transmitter and receiver carrier frequencies. Unless a symmetric bit rate is required, the maximum bit rate for each of those baud rates is used as the transmission bit rate for the corresponding modem. If a symmetric bit rate is required, the lower of the two bit rates (i.e. the bit rate for the local modem receiver and the bit rate for the remote modem receiver) is used as the common bit rate.

The main outputs of the line probing processor are the transmitter and receiver baud rates, $Q_1$ and $Q_2$, the transmitter and receiver carrier frequencies, $f_{c1}$ and $f_{c2}$, the transmitter and receiver bit rates, $R_1$ and $R_2$, as well as an error code, which may indicate some unexpected error during the line probing process (such as failure in detecting the line probing signal, failure in synchronization, DPSK transmission error, etc.).

After the line probing is completed, modems go through a training at the selected baud rate and carrier frequencies and subsequently begin exchanging actual data at the selected rates.

Although the described embodiment used a four-wire type modem, it should be understood that this invention could also be carried out using a two-wire type modem. During full-duplex communication using a two-wire type modem, the received signals may, of course, include echo. For purposes of conducting the line probing measurements, it is desirable to avoid echoes in the received signal and this can easily be accomplished by having the modems conduct the line probing measurements sequentially rather than concurrently, as in the above-described embodiment.

Other embodiments may include the following features. The selection of the number of bits per baud may be based on the measurement of impairments in addition to or other than NLD and receive level. Also, in certain applications, no operational constraints may be necessary, in which case, the information exchange between the local modem and the remote device may be simplified. For example, each modem could immediately select its respective bit rate and the transmission band based upon its channel measurement and then exchange its final decision with the other modem. In addition, other exchange protocols may be used. Further, the selection of the transmission band may be based only on the measured frequency response of the channel and may not require measurement of the noise spectrum. Also, baseband data transmission may be employed instead of the passband transmission used in the described embodiment.

Other embodiments are within the following claims.

What is claimed is:

1. A modem for receiving data sent from a remote device over a communication channel by using a single carrier modulated signal, the modem comprising:
   a. a receiver for receiving the modulated signal and for receiving a line probing signal sent by the remote device over the channel, the receiver being capable of receiving the modulated signal over any one of a plurality of frequency bands, said line probing signal simultaneously stimulating more than one of said plurality of frequency bands;
   b. a line probing processor for measuring characteristics of the channel based upon the received line probing signal; and
   c. a selector for selecting one of the plurality of frequency bands, said selection being based upon the measured characteristics of the channel, said selected frequency band to be used for receiving the modulated signal from the remote device.

2. The modem of claim 1 wherein the line probing processor comprises:
   a. a spectrum analyzer for generating discrete spectral representations of the received line probing signal; and
   b. a module for estimating a frequency response for the channel based upon the discrete spectral representations of the received line probing signal, the frequency response being estimated at more than one frequency.

3. The modem of claim 1 wherein the line probing processor comprises:
   a. a spectrum analyzer for generating discrete spectral representations of the received line probing signal; and
   b. a module for estimating a power spectral density of channel noise based upon the discrete spectral representations of the received line probing signal.

4. The modem of claims 1, 2, or 3 wherein the modulated signal is a linearly modulated signal and wherein each one of said plurality of frequency bands is characterized by a corresponding baud rate and carrier frequency, the modulated signal from the remote device being received at the corresponding baud rate associated with said selected frequency band.

5. The modem of claim 4 wherein the carrier frequency of two or more of said plurality of frequency bands are the same.

6. The modem of claim 4 wherein the linearly modulated signal is a quadrature amplitude modulated signal.

7. The modem of claim 1 wherein the measured characteristics include a frequency response of the channel.

8. The modem of claim 1 wherein the receiver includes an adaptive filter for providing a desired overall impulse response to a decoder and wherein at least some of the measured characteristics take into account the adaptive filter.

9. The modem of claim 8 wherein the adaptive filter is used in conjunction with trellis precoding.

10. The modem of claim 3 wherein the module performs weighted periodogram averaging to estimate the power spectral density of channel noise based upon the discrete spectral representations of the received line probing signal.

11. The modem of claim 1 wherein the line probing signal is a substantially periodic signal.

12. A modem for receiving data sent from a remote device over a communication channel by using a single carrier modulated signal, the modem comprising:
   a. a receiver for receiving the modulated signal and for receiving a line probing signal sent by the remote device over the channel, the receiver being capable of receiving the modulated signal over any one of a plurality of frequency bands, each one of said plurality of frequency bands being characterized by a corresponding baud rate and carrier frequency;
   b. a line probe processor for measuring characteristics of the channel based upon the received line probing signal; and
   c. a selector for selecting one of the plurality of frequency bands, said selection being based upon the measured characteristics of the channel, the modulated signal from the remote device being received at the corresponding baud rate associated with said selected frequency band.

13. The modem of claim 12 wherein the line probing processor comprises:
   a. a spectrum analyzer for generating discrete spectral representations of the received line probing signal; and
   b. a module for estimating a frequency response for the channel based upon the discrete spectral representations of the received line probing signal, the frequency response being estimated at more than one frequency.

14. The modem of claim 12 wherein the line probing processor comprises:
   a. a spectrum analyzer for generating discrete spectral representations of the received line probing signal; and
   b. a module for estimating a power spectral density of channel noise based upon the discrete spectral representations of the received line probing signal.

15. The modem of claim 14 wherein the module performs weighted periodogram averaging to estimate the power spectral density of channel noise based upon the discrete spectral representations of the received line probing signal.

16. The modem of claim 15 wherein the module also estimates a power spectrum of the channel response based upon the discrete spectral representations of the received line probing signal and then computes a signal-to-noise ratio corresponding to the channel based upon both the power spectral density of channel noise and the power spectrum of the channel response.

17. The modem of claim 16 wherein the power spectrum of the channel response and the power spectral density of channel noise are estimated concurrently from the same received line probing signal.

18. The modem of claim 16 wherein the receiver further comprises an adaptive filter for providing a desired overall impulse response to a decoder and the signal-to-noise ratio is determined relative to the output of the adaptive filter.

19. The modem of claim 18 wherein the adaptive filter is used in conjuction with trellis precoding.

20. The modem of claim 1 further comprising a transmitter for transmitting information based upon the measured characteristics to the remote device so that the remote device may identify one of said plurality of frequency bands based upon said transmitted information and then communicate said identified band to the receiver and wherein the selector selects the identified band as said selected band.

21. The modem of claim 12 wherein the measured characteristics include a frequency response of the channel.

22. The modem of claim 12 wherein the receiver includes an adaptive filter for providing a desired overall impulse response for the channel and wherein at least some of the measured characteristic take into account the adaptive filter.

23. The modem of claim 12 wherein the measured characteristics further include a signal-to-noise ratio of the channel measured at more than one frequency.

24. The modem of claim 12 wherein the line probing signal is a substantially periodic signal.

25. The modem of claim 11 or 24 wherein the line probing signal is of the form:

$$x(t)=A\Sigma_k\cos(2\pi k f_\Delta t+\theta_k),$$

where
x(t) represents the line probing signal;
t is a time variable;
A is a constant;
$f_\Delta$ is a frequency resolution;
$\theta_k$ is a phase angle;
k is a frequency interval index which belongs to a subset of the integers ranging from $k_1$ through $k_2$;
$k_1$ specifies the lowest frequency index included in the line probing signal; and
$k_2$ specifies the highest frequency index included in the line probing signal.

26. The modem of claim 25 wherein the phase angles $\theta_k$ of the line probing signal are selected to achieve a small peak-to-average ratio of the line probing signal.

27. The modem of claim 25 wherein the phase angles $\theta_k$ of the line probing signal are equal to:

$$\theta_k=\pi(k-k_2)^2(k-k_1)$$

28. The modem of claim 12 wherein the modulated signal from the remote device is received at the corresponding baud rate and carrier frequency associated with said selected frequency band, and wherein at least some of the carrier frequencies associated with said plurality of frequency bands are different.

29. The modem of claim 1 wherein the measured characteristics further include a signal-to-noise ratio of the channel measured at more than one frequency.

30. The modem of claim 3 wherein received line probing signal may include an impairment (e.g. frequency offset and/or low frequency phase jitter) and wherein the line probing processor further comprises an offset monitor for reducing effects of said impairment on the discrete representation of the received signal prior its being used to determine the power spectral density of channel noise.

31. The modem of claim 30 wherein the line probing signal is substantially periodic and the discrete spectral representations are generated for each period of the received line probing signal and wherein the offset monitor reduces the effects of said impairment by first estimating said impairment and by then rotating the discrete representation corresponding to a current period of the received line probing signal by an amount determined by the estimate of said impairment.

32. The modem of claim 31 wherein the offset monitor estimates said impairment by comparing the discrete spectral representation corresponding to the current period of the received line probing signal to a reference signal derived from the discrete spectral representations corresponding to at least one previous period of the received line probing signal.

33. The modem of claim 2 or 3 wherein the discrete spectral representations of the received line probing signal are M-point Discrete Fourier Transforms.

34. The modem of claim 1 wherein the receiver is also capable of receiving the modulated signal at any one of a plurality of bit rates and wherein the modem further comprises logic for selecting one of the plurality of different bit rates based upon the measured characteristics of the receiver channel, said selected bit rate to be used for receiving the modulated signal from the remote device.

35. The modem of claim 34 wherein the line probing processor comprises:
 a. a spectrum analyzer for generating discrete spectral representations of the received line probing signal; and
 b. a module for computing a nonlinear distortion indicator based upon the discrete spectral representations of the received line probing signal.

36. The modem of claim 34 wherein the receiver comprises a monitor circuit for measuring a power level of the received line probing signal and wherein the measured characteristic includes a quantity derived from the received power level.

37. A modem for transmitting data to a remote device over a communication channel by using a single carrier modulated signal, the modem comprising:
 a. a signal generator for generating a line probing signal;
 b. a transmitter for transmitting the modulated signal and for transmitting the line probing signal to the remote device over the channel, the transmitter being capable of transmitting the modulated signal over any one of a plurality of frequency bands, said line probing signal simultaneously stimulating more than one of said plurality of frequency bands;
 c. a receiver for receiving characteristics of the channel from the remote device, the characteristics being derived by the remote device from the transmitted line probing signal; and
 d. a selector for selecting one of the plurality of frequency bands, said selection being based upon the measured channel characteristics, the selected frequency band to be used for transmitting the modulated signal to the remote device.

38. The modem of claim 37 wherein the modulated signal is a linearly modulated signal and wherein each one of said plurality of frequency bands is characterized by a corresponding baud rate and carrier frequency.

39. The modem of claim 38 wherein the linearly modulated signal is a quadrature amplitude modulated signal.

40. The modem of claim 37 wherein the measured characteristics include a frequency response of the channel.

41. The modem of claim 37 wherein the measured characteristics further include a signal-to-noise ratio of the channel measured at more than one frequency.

42. The modem of claim 37 wherein the line probing signal is a substantially periodic signal.

43. The modem of claim 42 wherein the line probing signal is of the form:

$$x(t) = A\Sigma_k \cos(2\pi k f_\Delta t + \theta_k),$$

where
- x(t) represents the line probing signal;
- t is a time variable;
- A is a constant;
- $f_\Delta$ is a frequency resolution;
- $\theta_k$ is a phase angle;
- k is a frequency interval index which belongs to a subset of the integers ranging from $k_1$ through $k_2$;
- $k_1$ specifies the lowest frequency index included in the line probing signal; and
- $k_2$ specifies the highest frequency index included in the line probing signal.

44. The modem of claim 43 wherein the phase angles $\theta_k$ of the line probing signal are selected to achieve small peak-to-average ratio for the line probing signal.

45. The modem of claim 43 wherein the phase angles $\theta_k$ of the line probing signal are equal to:

$$\theta_k = \pi(k - k_2)^2 / (k_2 - k_1)$$

46. A modem for receiving data sent from a remote device over a communication channel by using a single carrier modulated signal, the modem comprising:
  a. a receiver for receiving the modulated signal and for receiving a line probing signal sent by the remote device over the channel, the receiver being capable of receiving the modulated signal at any one of a plurality of bit rates;
  b. a line probing processor for measuring characteristics of the channel based upon the received line probing signal; and
  c. a selector for selecting one of the plurality of bit rates, said selection being based upon the measured characteristics of the receiver channel, the selected bit rate to be used for receiving the modulated signal from the remote device.

47. The modem of claim 46 wherein the line probing processor comprises:
  a. a spectrum analyzer for generating discrete spectral representations of the received line probing signal; and
  b. a module for estimating a frequency response for the channel based upon the discrete spectral representations of the received line probing signal, the frequency response being estimated at more than one frequency.

48. The modem of claims 46 wherein the line probing processor comprises:

a. a spectrum analyzer for generating discrete spectral representations of the received line probing signal; and
  b. a module for estimating a power spectral density of channel noise based upon the discrete spectral representations of the received line probing signal.

49. The modem of claims 46, 47, or 48 wherein the modulated signal is a linearly modulated signal.

50. The modem of claim 49 wherein the measured characteristics include a frequency response of the channel.

51. The modem of claim 49 wherein the linearly modulated signal is a quadrature amplitude modulated signal.

52. The modem of claim 48 wherein the module performs weighted periodogram averaging to estimate the power spectral density of channel noise from the discrete spectral representations of the received line probing signal.

53. The modem of claim 52 wherein the module also estimates a power spectrum of the channel response based upon the discrete spectral representations of the received line probing signal and then computes a signal-to-noise ratio corresponding to the channel based upon both the power spectral density of channel noise and the power spectrum of the channel response.

54. The modem of claim 53 wherein the power spectrum and the spectral power density of channel noise are estimated concurrently from the same received line probing signal.

55. The modem of claim 48 wherein received line probing signal may include an impairment (e.g. frequency offset and/or low frequency phase jitter) and wherein the line probing processor further comprises an offset monitor for reducing effects of said impairment on the discrete representation of the received signal prior its being used to determine the power spectral density of channel noise.

56. The modem of claim 55 wherein the line probing signal is substantially periodic and a discrete spectral representation is generated for each period of the received line probing signal and wherein the offset monitor reduces the effects of said impairment by first estimating said impairment and by then rotating the discrete representation corresponding to a current period of the received line probing signal by an amount determined by the estimate of said impairment.

57. The modem of claim 56 wherein the offset monitor estimates said impairment by comparing the discrete spectral representation corresponding to the current period of the received line probing signal to a reference signal derived from the discrete spectral representations corresponding to at least one previous period of the received line probing signal.

58. The modem of claim 46 wherein the measured characteristics include a signal-to-noise ratio of the channel measured at more than one frequency.

59. The modem of claim 46 wherein the line probing signal is a substantially periodic signal.

60. The modem of claim 59 wherein the line probing signal is of the form:

$$x(t) = A\Sigma_k \cos(2\pi k f_\Delta t + \theta_k),$$

where
- x(t) represents the line probing signal;
- t is a time variable;
- A is a constant;

$f_\Delta$ is a frequency resolution;

$\theta_k$ is a phase angle;

k is a frequency interval index which belongs to a subset of the integers ranging from $k_1$ through $k_2$;

$k_1$ specifies the lowest frequency index included in the line probing signal; and $k_2$ specifies the highest frequency index included in the line probing signal.

61. The modem of claim 60 wherein the phase angles $\theta_k$ of the line probing signal are selected to achieve a small peak-to-average ratio for the line probing signal.

62. The modem of claim 60 wherein the phase angles $\theta_k$ of the line probing signal are equal to:

$$\theta_k = \pi(k-k_2)^2/(k_2-k_1)$$

63. The modem of claim 46 wherein the receiver further comprises an adaptive filter for providing a desired overall impulse response to a decoder and wherein at least some of the measured characteristics take into account the adaptive filter.

64. The modem of claim 63 wherein the adaptive filter is used in conjuction with trellis precoding.

65. The modem of claim 46 further comprising a transmitter for transmitting information based upon the measured characteristics to the remote device so that the remote device may identify one of said plurality of bit rates based upon said information and then communicate said identified bit rate to the receiver and wherein the selector selects the identified bit rate as said selected bit rate.

66. The modem of claim 46 wherein the line probing processor comprises:
   a. a spectrum analyzer for generating discrete spectral representations of the received line probing signal; and
   b. a module for computing a nonlinear distortion indicator based upon the discrete spectral representations of the received line probing signal.

67. The modem of claim 46 wherein the receiver comprises a monitor circuit for measuring a power level of the received line probing signal and wherein the measured characteristics includes a quantity derived from the received power level.

68. In a system in which a local modem receives data sent by a remote device over a receiver channel in the form of a first single carrier modulated signal, the modem being capable of receiving the first modulated signal over any one of a first plurality of frequency bands, a method for establishing communication conditions comprising the steps of:
   a. sending a first line probing signal from the remote device to the local modem over the receiver channel, said line probing signal simultaneously stimulating more than one of said plurality of frequency bands;
   b. receiving the first line probing signal in the local modem;
   c. measuring characteristics of the receiver channel based upon the received first line probing signal; and
   d. selecting one of the first plurality of frequency bands based upon the measured characteristics of the receiver channel, said selected one of the first plurality of frequency bands to be used for receiving the first modulated signal from the remote device.

69. The method of claim 68 wherein the modem transmits data to the remote device over a transmitter channel by using a second single carrier modulated signal and being capable of sending the second signal over any one of a second plurality of frequency bands, the method further comprising the steps of:
   a. sending a second line probing signal from the local modem to the remote device over the transmitter channel;
   b. receiving the second line probing signal in the remote device;
   c. measuring characteristics of the transmitter channel based upon the received second line probing signal; and
   d. selecting one of the second plurality of frequency bands based upon the measured characteristics of the transmission channel, said selected one of the second plurality of frequency bands to be used for sending the second modulated signal to the remote device.

70. In a system in which a local modem receives data sent by a remote device over a receiver channel in the form of a first single carrier modulated signal, the modem being capable of receiving the first modulated signal at any one of a first plurality of bit rates, a method for establishing communication conditions comprising the steps of:
   a. sending a first line probing signal from the remote device to the local modem over the receiver channel;
   b. receiving the first line probing signal in the local modem;
   c. measuring characteristics of the receiver channel based upon the received first line probing signal; and
   d. selecting one of the first plurality of bit rates based upon the measured characteristics of the receiver channel, said selected one of the first plurality of bit rates to be used for receiving the first modulated signal from the remote device.

71. The method of claim 70 wherein the modem transmits data to the remote device over a transmitter channel by using a second single carrier modulated signal and is capable of sending the second signal at any one of a second plurality of bit rates, the method further comprising the steps of:
   a. sending a second line probing signal from the local modem to the remote device over the transmitter channel;
   b. receiving the second line probing signal in the remote device;
   c. measuring characteristics of the transmitter channel based upon the received second line probing signal; and
   d. selecting one of the second plurality of bit rates based upon the measured characteristics of the transmission channel, said selected one of the second plurality of bit rates to be used for sending the second modulated signal to the remote device.

* * * * *

UNITED STATES PATENT AND TRADEMARK OFFICE
CERTIFICATE OF CORRECTION

PATENT NO. : 5,048,054

DATED : September 10, 1991

INVENTOR(S) : Vedat M. Eyuboglu, et al

It is certified that error appears in the above-identified patent and that said Letters Patent is hereby corrected as shown below:

Col. 4, line 14, after "probing", insert --processors--.

Col. 5, line 60, "$f_{66}$" should be --$f_\Delta$--.

Col. 6, example (9), "$f_{66}$" should be --$f_\Delta$--.

Col. 6, example (10), "$f_{66}$" should be --$f_\Delta$--.

Col. 7, example (11), "$f_{66}$" should be --$f_\Delta$--.

Col. 7, line 9, "$\Psi"(kf_\Delta)$" should be --$\Phi(kf_\Delta)$--.

Col. 8, line 57, "$h'_{nb}$" should be --$h'_n$--.

Col. 9, line 7, delete "L" after "between".

Col. 10, line 33, "describe" should be --described--.

UNITED STATES PATENT AND TRADEMARK OFFICE
CERTIFICATE OF CORRECTION

PATENT NO. : 5,048,054

DATED : September 10, 1991

INVENTOR(S) : Vedat M. Eyuboglu, et al

It is certified that error appears in the above-identified patent and that said Letters Patent is hereby corrected as shown below:

Col. 12, line 29, "Q" should be $--Q_1--$.

Col. 13, line 41, after "phase", insert --.--.

Col. 14, line 2, after "frequencies", insert --,--.

Signed and Sealed this

Fifth Day of January, 1993

*Attest:*

DOUGLAS B. COMER

*Attesting Officer*    Acting Commissioner of Patents and Trademarks